United States Patent
Quintard et al.

(10) Patent No.: US 8,409,364 B2
(45) Date of Patent: Apr. 2, 2013

(54) PROCESS FOR REMOVING A COMPOSITE COATING PRESENT ON THE SURFACE OF A GAS CARTRIDGE

(75) Inventors: Jacques Quintard, Presles (FR); Frederic Richard, Parmain (FR); Charles Truchot, Poissy (FR)

(73) Assignee: L'Air Liquide Societe Anonyme pour l'Etude el l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 13/395,809

(22) PCT Filed: Sep. 14, 2010

(86) PCT No.: PCT/FR2010/051903
§ 371 (c)(1),
(2), (4) Date: Mar. 13, 2012

(87) PCT Pub. No.: WO2011/036373
PCT Pub. Date: Mar. 31, 2011

(65) Prior Publication Data
US 2012/0171385 A1 Jul. 5, 2012

(30) Foreign Application Priority Data
Sep. 23, 2009 (FR) ...................................... 09 56538

(51) Int. Cl.
*B08B 3/00* (2006.01)
(52) U.S. Cl. ................ 134/34; 134/30; 134/31; 134/32; 134/33; 134/35; 134/36; 134/37; 134/42; 451/7; 451/38; 451/39; 451/40; 451/53

(58) Field of Classification Search ............... 134/30, 134/31, 32, 33, 34, 35, 36, 37, 42; 451/7, 451/38, 39, 40, 53
See application file for complete search history.

(56) References Cited

U.S. PATENT DOCUMENTS

| | | | | |
|---|---|---|---|---|
| 3,526,162 | A * | 9/1970 | Willcox | ............................ 83/16 |
| 5,456,085 | A * | 10/1995 | Popp et al. | ......................... 62/64 |
| 5,456,629 | A | 10/1995 | Bingham | |
| 5,782,253 | A | 7/1998 | Cates et al. | |
| 2006/0049274 | A1 | 3/2006 | Hume et al. | |

FOREIGN PATENT DOCUMENTS

| | | |
|---|---|---|
| DE | 197 09 621 | 9/1998 |
| DE | 198 07 635 | 8/1999 |
| DE | 10 2008 051557 | 5/2009 |
| EP | 0 887 088 | 12/1998 |

OTHER PUBLICATIONS

International Search Report for PCT/FR2010/051903, mailed Mar. 21, 2011.
French Search Report for FR0956538, mailed May 6, 2010.

* cited by examiner

*Primary Examiner* — Bibi Carrillo
(74) *Attorney, Agent, or Firm* — Elwood L. Haynes

(57) ABSTRACT

The invention relates to a method for removing at least part of at least one layer of a composite coating that is formed of fibers and at least one resin that is present on the surface of the body of a gas cartridge. In said method, at least one liquid nitrogen stream is dispensed at a temperature less than −100 DEG C at a pressure of at least 00 bars upon contact with said coating so as to remove at least part of said coating layer present on the body of the gas cartridge.

12 Claims, 2 Drawing Sheets

PROCESS FOR REMOVING A COMPOSITE COATING PRESENT ON THE SURFACE OF A GAS CARTRIDGE

CROSS-REFERENCE TO RELATED APPLICATIONS

This application is a §371 of International PCT Application PCT/FR2010/051903, filed Sep. 14, 2010, which claims §119(a) foreign priority to French patent application FR0956538, filed Sep. 23, 2009.

BACKGROUND

1. Field of the Invention

The invention relates to a process for removing a composite coating present on the body of a gas bottle used to store pressurized gas so that the body of said gas bottle may subsequently be recycled.

2. Related Art

Generally, there are four types of gas bottle used for storing gas, namely:

type I bottles, which are bottles made entirely of metal (steel or aluminum);

type II bottles, which are bottles consisting of a metal (steel or aluminum) body coated with a composite, KEVLAR/epoxy for example;

type III bottles, which are bottles consisting of an aluminum body, of smaller thickness than the bodies of type I and II bottles, coated with a composite, for example made of KEVLAR/epoxy; and type IV bottles, which are bottles consisting of a blow-molded polyethylene or polyamide body coated with a composite.

The advantage of type II and III bottles lies in the fact that the bottles, while retaining the same mechanical properties as type I bottles, are lighter. Type IV bottles are used in very specific cases. Type II and III bottles have a metal body, called a liner, in which the gas is stored, surrounded by a composite "skin".

However, European environmental standards are increasingly strict and now require that products are designed to be recycled. These bottles are thus currently recycled in the following way.

Firstly, the bottle is cut into two parts and, on the one hand, the metal is recovered and, on the other hand, the composite is recovered and ground up.

However, cutting the metal liner into two half-bottles does not allow the liner to be directly recycled as a gas container. It is only recycled as a base metal that needs to be remelted and reformed to manufacture new liners. Therefore, at the present time the recycling operation is not optimized.

The problem to be solved is thus to provide a process that allows effective and ecological recycling of gas bottles, in particular type II and III bottles, i.e. gas bottles consisting of a composite-coated metal body or liner, which process does not require the bodies of the used bottles to be cut into two for the composite coating to be removed from their surface, and consequently allows said used bottle bodies to be reused without subsequent remelting and reforming.

SUMMARY OF THE INVENTION

The solution of the invention is a process for removing at least some of at least one layer of a composite coating formed from fibers and at least one resin, present on the surface of the body of a gas cylinder, in which said coating is brought into contact with at least one liquid-nitrogen jet at a temperature below −100° C. and at a pressure of at least 500 bar so as to remove at least some of said coating layer present on the body of the gas bottle.

In other words, one or more pressurized liquid-nitrogen jets are delivered so as to impact the surface of the composite coating to be removed. The impact of the one or more jets on the coating will then cause it to debond from the body of the gas bottle, and to be removed under the effect of the pressure of the one or more liquid-nitrogen jets.

Depending on the circumstances, the process of the invention may comprise one or more of the following features:

the composite coating is formed from fibers and at least one thermosetting or thermoplastic resin.

the coating comprises glass, basalt, carbon or aramid fibers.

the coating comprises a thermosetting resin chosen from epoxy resins, polyurethane resins and vinyl resins.

the coating comprises a thermoplastic resin chosen from resins of the polyethylene, polypropylene, polyamide-6 and polyamide-12 types.

the composite coating of the body is made of Kevlar/epoxy or of carbon/epoxy.

at least one liquid-nitrogen jet is delivered via at least one delivery nozzle.

at least one liquid-nitrogen jet is delivered by a number of rotating or oscillating nozzles.

the body of the gas bottle is made of metal, preferably steel or aluminum, or of a ceramic.

the body of the gas bottle is made of polyethylene or of polyamide.

the pressure of the liquid-nitrogen jet is below 4500 bar, preferably between 1000 and 4000 bar and even more preferably is about 3000 to 3800 bar.

the liquid nitrogen is at a temperature below about −130° C., preferably between about −140° C. and −230° C.

the gas bottle is rotated relative to the one or more nozzles delivering the pressurized liquid nitrogen.

DETAILED DESCRIPTION OF THE INVENTION

Figure 1:
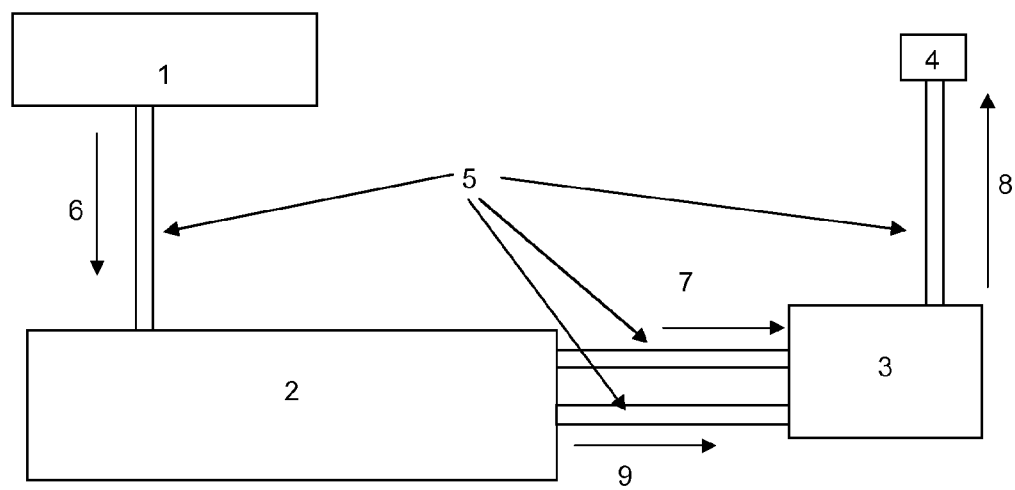
FIG. 1 illustrates an apparatus according to one embodiment of the present invention.
Figure 2:
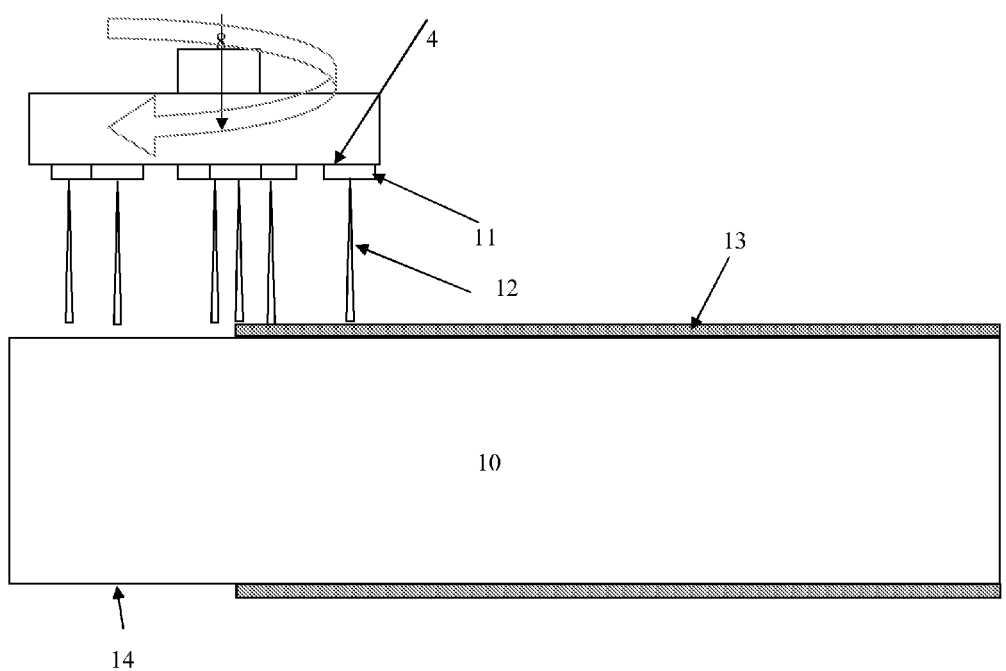
FIG. 2 illustrates a nozzle-bearing tool that may be used in accordance with one embodiment of the present invention.

The solution of the invention therefore consists in detaching the composite layer present on the surface of the body of the bottle using one or more liquid-nitrogen jets at a very high pressure and may be implemented by means of an apparatus such as that of FIG. 1 equipped with the nozzle-bearing tool shown schematically in FIG. 2.

Thus, as illustrated in FIG. 1, an apparatus for surface stripping with jets of cryogenic liquid, which can be used to remove the composite surface-coating layer 13 of the gas bottles 10, consists of a storage vessel 1, such as a tank, for storing liquid nitrogen (also called $LN_2$ below) which supplies, via a low-pressure liquid nitrogen supply line 6, i.e. at about 3 to 6 bar and at a temperature of about −180° C., a compression device 2 having an internal upstream heat exchanger and compressor making it possible for the liquid nitrogen to be brought to an ultrahigh pressure (UHP). The compression device 2 therefore compresses the $LN_2$ coming from the storage tank 1.

The $LN_2$ at the first pressure (UHP) is then transferred via a transfer line (7) to an external downstream heat exchanger 3 where the UHP $LN_2$ is cooled with atmospheric pressure liquid nitrogen (at 9), typically so as to obtain UHP liquid nitrogen.

The above results in $LN_2$ at a pressure (UHP) typically above 1000 bar, generally between 2000 bar and 5000 bar, advantageously between about 3000 and 4000 bar, and at a temperature below −140° C., typically between −140° C. and −180° C., for example about −150° C. to −160° C., which is delivered (at 8) to the surface stripping tool 4, or the like, equipped with delivery nozzles 11 that deliver jets 12 of UHP liquid nitrogen.

The tank 1 is a high-capacity fixed or moveable tank, such as a tanker truck or a storage tank capable of storing thousands of liters of liquid nitrogen, and is generally located outdoors, i.e. in the open air.

The tank 1 is connected to the apparatus by means of insulated pipes comprising one or more control valves. Furthermore, the $LN_2$ is also transferred between the various elements of the system via insulated ducts. The overall gas flow rate is approximately 20 l/min i.e. 15 $m^3$/min.

In general, the compression device 2, the external exchanger 3 and above all the tool 4 are in principle located in one or more buildings.

As illustrated in FIG. 2, to strip the composite coating layer 13, i.e. the layer formed from a mixture of fibers/resin, present on the surface of the gas bottles 10, a tool 4 is used that is equipped with nozzles 11 supplied with UHP $LN_2$ (at 8), which are preferably made to rotate or oscillate so as to obtain UHP $LN_2$ jets 12 that are used to strip the surface of the bottles 10 to be processed, thus removing the composite surface-coating layer thereon and then enabling stripped bodies 14 of bottles 10 to be recovered, i.e. bottles with no coating 13. The bodies 14 of bottles 10 may then be recycled, and may especially be covered with a new coating layer 13 in order to be used again to store pressurized gas.

EXAMPLE

In order to demonstrate the effectiveness of the process of the invention, trials have were carried out under the following conditions.

A cylindrical gas bottle 1.68 m in height and 0.23 m in diameter, the steel or aluminum body of which was covered in a surface-coating layer of 10 mm of a KEVLAR/epoxy composite, was treated with liquid-nitrogen jets at 3200 bar and at a temperature of −155° C. Said nitrogen jets were ejected by a rotating tool having a number of nozzles, such as that in FIG. 2. The jets traced a 0.054 m strip. The rate of advance of the rotating tool was 1 m/min. When the entire length of the bottle had been processed over a width of 0.054 m, the bottle was rotated by 0.053 m (1 mm overlap).

The trial results showed that the composite "skin" or surface coating came off very easily from the body under the effect of the high-pressure liquid-nitrogen jets. The bodies of the bottles were stripped in about 18 to 20 minutes.

Moreover, the throughput of such a stripping operation was about 4 $m^2$/h. Naturally, the use of a number of nozzles simultaneously makes it possible to increase the rate at which a bottle is processed.

Furthermore, the process used did not affect the integrity of the bottle body, i.e. the nitrogen jets did not etch the metal, thereby allowing it to be easily reused, and therefore making the process ecological and environmentally friendly.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A process for removing at least some of at least one layer of a composite coating present on a surface of a gas cylinder, in which said composite coating is brought into contact with at least one liquid-nitrogen jet at a temperature below −100° C. and at a pressure of at least 500 bar, so as to remove at least some of at least one layer of the composite coating, wherein said composite coating is formed from fibers and at least one thermosetting or thermoplastic resin, and said fibers are selected from the group consisting of glass, basalt, carbon or aramid fibers.

2. The process of claim 1, wherein the thermosetting resin is chosen from epoxy resins, polyurethane resins and vinyl resins or the thermoplastic resin is chosen from resins of polyethylene, polypropylene, polyamide-6 and polyamide-12 types.

3. The process of claim 2, wherein the gas cylinder has a body, and body is coated with said composite coating comprising said aramid fibers and said epoxy resins or said carbon fibers and said epoxy resins.

4. The process of claim 1, wherein said at least one liquid-nitrogen jet is delivered via at least one delivery nozzle.

5. The process of claim 1, wherein said at least one liquid-nitrogen jet is delivered by a rotating or oscillating nozzle.

6. The process of claim 1, wherein a body of the gas cylinder is made from steel, aluminum, ceramic, polyethylene or polyamide.

7. The process of claim 1, wherein the pressure of the liquid-nitrogen jet is below 4500 bar.

8. The process of claim 1, wherein the liquid nitrogen is at a temperature below −130° C.

9. The process of claim 1, wherein the gas cylinder is rotated relative to one or more nozzles delivering the liquid nitrogen.

10. The process of claim 7, wherein the pressure of the liquid-nitrogen jet is between 1000 and 4000 bar.

11. The process of claim 8, wherein the liquid nitrogen is at a temperature between −140° C. and −230° C.

12. The process of claim 10, wherein the pressure of the liquid-nitrogen jet is about 3000 to 3800 bar.

* * * * *